(12) United States Patent
Vire et al.

(10) Patent No.: US 6,987,680 B2
(45) Date of Patent: Jan. 17, 2006

(54) SERIES CHOPPER WITH SYNCHRONOUS SWITCHING

(75) Inventors: Guillaume Vire, Valence (FR);
Christophe Taurand, Valence (FR)

(73) Assignee: Thales, Paris (FR)

( * ) Notice: Subject to any disclaimer, the term of this patent is extended or adjusted under 35 U.S.C. 154(b) by 182 days.

(21) Appl. No.: 10/470,715

(22) PCT Filed: Dec. 13, 2002

(86) PCT No.: PCT/FR02/04350

§ 371 (c)(1),
(2), (4) Date: Jul. 30, 2003

(87) PCT Pub. No.: WO03/055048

PCT Pub. Date: Jul. 3, 2003

(65) Prior Publication Data

US 2004/0245972 A1 Dec. 9, 2004

(30) Foreign Application Priority Data

Dec. 20, 2001 (FR) .................................. 01 16567

(51) Int. Cl.
*H02M 7/00* (2006.01)
(52) U.S. Cl. ..................................... 363/124
(58) Field of Classification Search ............. 363/21.06, 363/21.14, 123, 124; 323/222–226, 265, 323/268, 270, 271, 273
See application file for complete search history.

(56) References Cited

U.S. PATENT DOCUMENTS

| 5,174,457 A | 12/1992 | Carroll et al. |
| 5,357,419 A | 10/1994 | Limpaecher |
| 5,565,761 A * | 10/1996 | Hwang .................. 323/222 |

(Continued)

FOREIGN PATENT DOCUMENTS

GB       2 246 648 A       2/1992

OTHER PUBLICATIONS

Patent Abstract of Japan; vol. 016, No. 18 (E-1155); Jan. 17, 1992 & JP 03 235 657 A; Oct. 21, 1991.

*Primary Examiner*—Matthew V. Nguyen
(74) *Attorney, Agent, or Firm*—Lowe Hauptman & Berner, LLP (57) ABSTRACT

The invention relates to a series chopper comprising: a pair of input terminals A and B for connecting a DC input voltage Vin, a pair P of breakers SB, ST in series connected by the breaker SB to the input terminal B, ST comprising a control input Cm1 for setting ST either into an on state or into an isolated state, SB comprising a control input Cm2 for setting SB either into an on state or into an isolated state, a pair of output terminals C and D, for supplying, with an output voltage Vout, a load R the output terminal D being connected to the input terminal B and the output terminal C to the point of connection between the two breakers SB and ST in series across an inductor. The series chopper comprises K other additional pairs $P_i$ of breakers in series between the input terminal A and the free side of the breaker ST with i=1, 2 . . . K. K input capacitors $Cf_i$ in series connected to the K pairs of breakers with i=1, 2 . . . K, . . . , K output capacitors $Cs_i$ in series, each output capacitor $Cs_i$ being connected between the common point of the breakers of the pair $P_i$ and the common point of the breakers of the previous pair $P_{i-1}$, with i=1, 2, . . . K, (when i=1, $P_{i-1}=P_0=P$). The breakers of these other K additional pairs are operated simultaneously so as to form, when the breaker SB of the pair P is operated into the on state, a first network of capacitors, and when the breaker ST of the pair P is operated into the on state, a second network of capacitors.

20 Claims, 8 Drawing Sheets

U.S. PATENT DOCUMENTS

| | | |
|---|---|---|
| 5,636,108 A | 6/1997 | Taurand |
| 5,663,874 A * | 9/1997 | Mader et al. ............ 363/21.14 |
| 5,745,351 A | 4/1998 | Taurand |
| 6,121,768 A | 9/2000 | Taurand |
| 6,181,215 B1 * | 1/2001 | Kuttner ................ 331/116 FE |
| 6,462,558 B1 | 10/2002 | Taurand |
| 6,473,323 B1 | 10/2002 | Taurand |
| 6,606,022 B1 | 8/2003 | Taurand |
| 6,771,521 B1 * | 8/2004 | Xiong et al. .................. 363/53 |

* cited by examiner

Prior Art

SERIES CHOPPER WITH SYNCHRONOUS SWITCHING

CROSS-REFERENCE TO RELATED APPLICATIONS

The present Application is based on International Application No. PCT/FR02/04350, filed on Dec. 13, 2002, which in turn corresponds to FR 01/16567 filed on Dec. 20, 2001, and priority is hereby claimed under 35 USC §119 based on these applications. Each of these applications are hereby incorporated by reference in their entirety into the present application.

FIELD OF THE INVENTION

The invention relates to a step-down series chopper, also known as a "buck converter", making it possible to obtain, from a DC supply voltage, another DC voltage of lower value.

BACKGROUND OF THE INVENTION

New electronic components are supplied with ever lower voltages (2.5 V, 1.8V, . . . 1.65 V and soon less than 1 V), the power requirements around the very low voltages are increasing and becoming predominant relative to the more conventional voltages +/−15 V et +5 V and 3.3 V.

Voltages below 3.3 V are not distributed and are installed directly onto user cards. The power supply is being moved as close as possible to the users so as to ensure better distribution and regulation.

The currents consumed are becoming ever larger since the power consumed by users is still the same or increasing (more numerous functionalities).

This trend is compelling providers of power supplies to make converters generating ever greater ratios of input voltage to output voltage.

The structures used are generally chopping converters that are not isolated for reasons of complexity, cost and to preserve high efficiencies as well as small dimensions. With a step-down type structure, these converters can with difficulty produce a transformation ratio of greater than 10 with efficiencies of greater than 90%.

To meet the requirements of the market to fulfill its integration demands, it is necessary to be able to provide these new converters in even smaller areas and hence with ever greater efficiencies so as not to increase the size of the dissipaters, and hence the size of the overall function (converters+dissipaters).

Among the structures of converters are step-down series choppers also known as "buck converters".

Figure 1A:
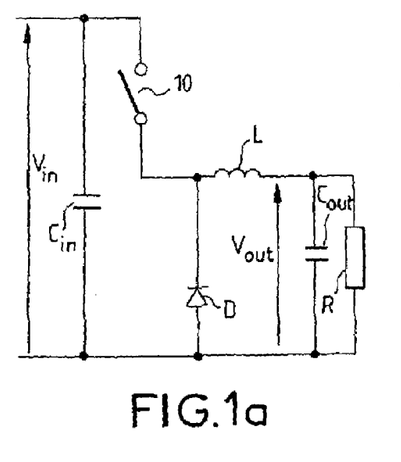
FIG. 1a already described represents the basic diagram of a step-down series chopper.

FIG. 1a shows the basic diagram of a "buck converter".

The circuit of FIG. 1a is supplied with a DC input voltage Vin and provides an output voltage Vout on a load R. An input capacitor Cin is present in parallel with the input. When it is operated for a time Ton, a breaker 10 makes it possible to apply the positive potential of the input voltage Vin to a terminal of an inductor L. The other terminal of the inductor is connected to a terminal of the load resistor R. The other terminal of the resistor is connected to the negative potential of the input voltage Vin. It will be assumed subsequently that the negative potential of Vin is 0 volts. When the breaker 10 is not operated for a time Toff, a diode D connected between the common point of the breaker and of the inductor and the negative potential of the input voltage Vin ensures the continuity of the current in the inductor.

SUMMARY OF THE INVENTION

The charts of FIGS. 1b, 1c, 1d and 1e show the principle of operation of the "buck converter".

Figure 1B:
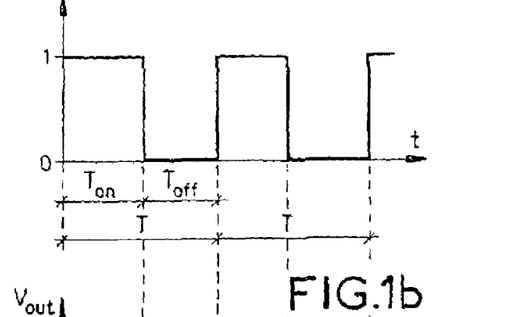

It is assumed that the switch 10 is switched with a frequency of period T, with T=Ton+Toff (see FIG. 1b).

Figure 1C:
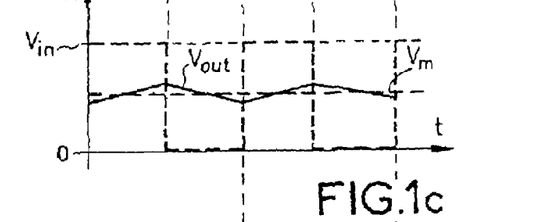

In the chart of FIG. 1c, the voltage across the terminals of the inductor is equal to Vin for the time Ton and to 0 volts for the time Toff. The mean voltage Vm of this point of the choke therefore lies between Vin and 0 volts as a function of the duty ratio Ton/T and will be given by:

$$Vm = (Ton/T) \cdot Vin$$

The mean voltage is found across the terminals of the resistor by virtue of the filtering which is carried out by the inductor L and a capacitor Cout in parallel with the load.

The chart of FIG. 1c shows the output voltage Vout averaged across the terminals of the load resistor R. The voltage Vout is a substantially DC voltage, to within ripple, dependent on the value of the inductor L and of the capacitor Cout.

Represented in the chart of FIGS. 1b and 1c is Ton=T/2 and consequently Vout=Vin/2.

Figure 1D:
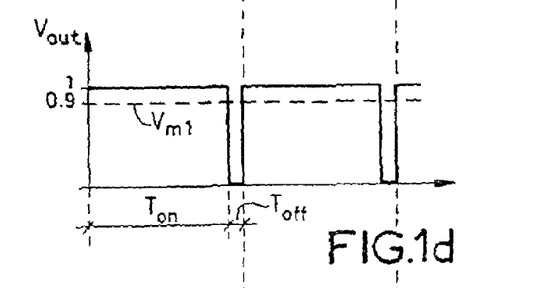
Figure 1E:
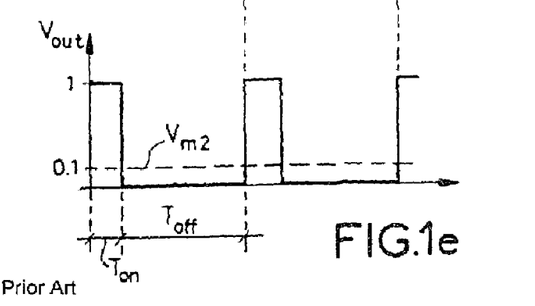

The chart of FIGS. 1c and 1d shows respectively two mean voltage values Vm1 and Vm2 across the terminals of the load resistor R for two values of the time Ton:

in chart 1c: Ton/T=0.9 and, in chart 1d: Ton/T=0.1.

Stated otherwise, when Ton/T is small, the voltage across the terminals of the load is small and conversely, when Ton is close to the period T the voltage across the terminals of the load is close to the DC input voltage.

In practice, the inverter is embodied as two semi-conductors in series, for example a bipolar transistor and a diode, a MOS and a diode or a MOS and a MOS in parallel with a diode, which are controlled by asynchronous signals of frequency 1/T. The simplest diagram is that of FIG. 1a, presented above, with a breaker and a diode to ensure the continuity of the current in the inductor. The structures with added MOS in parallel with the diode allow an increase in the efficiency. Specifically, this MOS which has to be operated when the other breaker is not operated ensures lower losses in the on state than a diode. The diode must, however, be retained in the layouts so as to alleviate the defects of control of the MOS type breakers between the control phases (the intrinsic diodes of the MOSs being of poor quality giving rise to additional losses).

The series choppers of the state of the art nevertheless have limitations. Specifically, a duty ratio Ton/T of 0.1 is in practice a minimum which can be obtained nowadays with acceptable efficiency and reliability performance while maintaining a frequency high enough to continue to employ small-sized filtering components. However, when one wishes to obtain an output voltage of less than a tenth of the input voltage, the on times Ton of the semi-conductor providing the energy to the load become very short and the breakers become very difficult to operate. Furthermore, if the output voltage decreases, for one and the same power delivered to the load, the currents in the semi-conductors become large, at the limits of their capabilities, with a loss of efficiency of the converter. The smaller the duty ratio Ton/T, the smaller the output voltage will be, but the more the components, input capacitors, inductors and breakers will be stressed (the input capacitors will provide the energy during Ton during ever shorter times hence the current inrushes will be large, the inductor will have a larger stress between Vout and Vin hence larger electromagnetic emissions, the breakers will see larger currents and voltage stresses (between Vin and 0 volts)).

Another means for obtaining a ratio of input voltage to output voltage of much greater than 10 consists in making a device comprising two choppers in cascade. In this device, the output voltage from a first chopper is applied to the input of a second chopper. Thus, it is possible to obtain much greater ratios of input and output voltage of the device than those obtained via a single chopper. This method nevertheless comprises the drawback of degraded overall efficiency of energy transfer from the power supply to the load and a greater cost of the voltage step-down device.

In order to alleviate the drawbacks of the series choppers of the prior art, the invention proposes a series chopper comprising:

a pair of input terminals A and B for connecting a DC input voltage Vin between these terminals, the potential of the terminal A being greater than the potential of the terminal B;

a pair P of breakers SB, ST in series connected by the breaker SB to the input terminal B, ST comprising a control input Cm1 for setting ST either into an on state by the application to its input of the control of a first control signal s1, or into an isolated state by application to its control input of a second control signal s2, SB comprising a control input Cm2 for setting SB either into an on state by the application to its control input of a third control signal s3, or into an isolated state by application to its control input of a fourth control signal s4, a pair of output terminals C and D, for supplying, with an output voltage Vout, a load R in parallel with a filtering capacitor Cout, the output terminal D being connected to the input terminal B and the output terminal C to the point of connection between the two breakers SB and ST in series across an inductor (L), characterized in that it comprises;

K other additional pairs $P_i$ of breakers in series between the input terminal A and the free side of the breaker ST comprising the same control inputs Cm1 and Cm2, with i=1, 2 ... K., each pair $P_i$ comprising two breakers $SB_i$ and $ST_i$ in series, the breaker $SB_i$ of each pair of breakers comprising a diode in parallel the cathode of the diode having to be on the common point of $ST_i$ and $SB_i$;

K input capacitors $Cf_i$ in series connected to the K pairs of breakers with i=1, 2 ... K., each capacitor $Cf_i$ being connected on both sides of the pair of breakers $P_i$;

K output capacitors $Cs_i$ in series, each output capacitor $Cs_i$ being connected between the common point of the breakers of the pair $P_i$ and the common point of the breakers of the previous pair $P_{i-1}$, with i=1, 2, ... K, (when i=1, $P_{i-1}=P_0=P$), the breakers of these other K additional pairs being operated simultaneously by the first and second signals applied to Cm1 and by the third and fourth signals applied to Cm2 forming, when the breaker ST is operated to the isolated state, a first network of capacitors, connected between the terminal A and the terminal B, comprising in series $Cf_k$, $Cf_{k-1}$ in parallel with $Cs_k$, ..., $Cf_i$ in parallel with $Cs_{i+1}$, ..., $Cf_1$ in parallel with $Cs_2$ and $Cs_1$ and when the breaker ST of the pair P is operated into the on state, these other K pairs of breakers $P_i$ forming a second network of capacitors connected between the terminal A and the inductor (L), comprising in series $Cf_k$ in parallel with $Cs_k$, ... $Cf_i$ in parallel with $Cs_i$, ... $Cf_1$ in parallel with $Cs_1$.

It may be remarked that the B of the breakers SB stands for "bottom" and that the T of the breakers ST stands for "TOP".

The diode in parallel with each breaker $SB_i$ can be the intrinsic diode of the component used.

Subsequently the first, second, third and fourth signals applied to the control inputs Cm1 and Cm2 will be simplified into a single control signal for the breakers $ST_i$ comprising two logic states, a high logic state and a low logic state, the high state of this control corresponding to the operating of $ST_i$ to the on state and of $SB_i$ to the isolated state and the low logic state to the toggling of $ST_i$ to the isolated state and to the toggling of $SB_i$ to the on state by virtue of the diode which ensures continuity. The time for which $ST_i$ is in the on state is denoted Ton and the time for which $ST_i$ is in the isolated state is denoted Toff.

The voltage Vout at the output of the chopper is dependant on the duty ratio Ton/T and is given by the relation:

Vout=Vin.(Ton/T).1/(K+1) with a chopping frequency of the input voltage Vin of period T=Ton+Toff regardless of the values of the capacitors.

Better operation of the chopper is obtained by preventing the control inputs Cm1 and Cm2 of the breakers being operated to the on state simultaneously.

So as not to create any current inrush between the phases, it is possible to optimize the values of the capacitors Cfi and Csi. These values will be optimized if the following relations hold:

when the following relations hold between the capacitances:

$Cf_k = Cx$ $Cf_{k-1} + Cs_k = Cx$

...

$Cf_i + Cs_{i+1} = Cx$ ...

$Cf_1 + Cs_2 = Cx$ $Cs_1 = Cx$ $Cf_k + Cs_k = Cy$ $Cf_{k-1} + Cs_{k-1} = Cy$

...

Cfi+Csi=Cy ...

$Cf_1 + Cs_1 = Cy$

Cx and Cy are values of capacitances to be defined.

This system of 2K+1 equations in 2K+2 unknowns can be solved by retaining a degree of freedom in the choice of Cx.

It may be remarked that (K+1) represents the total number N of pairs of breakers in series, that is to say the pair P plus the other K additional pairs $P_i$. We shall subsequently use for the calculations the total number N of pairs of breakers of the series chopper.

A diode is placed in parallel with the transistor SB to ensure the continuity of the current in the choke L during switchings and to alleviate the defects of control of the breakers.

In a configuration comprising a total of two pairs of breakers (N=2), i.e. a single other additional (K=1) pair $P_1$ of breakers $SB_1$ and $ST_1$ in series with the pair P, ST being connected to $SB_1$.

The capacitance $Cf_1$ may be equal to capacitance $Cs_1$ to avoid current inrushes between phases.

When the breaker ST of the pair P is in the isolated state, the input capacitor $Cf_1$ is placed in series with the output capacitor $Cs_1$ by the breaker $SB_1$ which comprises a diode in parallel or which is placed with the breaker SB into an on state, forming the first capacitive divider network. The capacitors $Cf_1$ and $Cs_1$ are loaded under the voltage $VCf_1 = VCs_1 = Vin/2$.

This relation is deduced from the fact that the two capacitors are in series, the following relation can be written:

$$VCf_1 + VCs_1 = Vin$$

Also, as will be demonstrated in the next phase, the two capacitors being placed in parallel $VCf_1 = VCs_1$. If the relation $Cf_1 = Cs_1 = Cx$ is imposed, the two stages provide the same energy. The load variations during the two phases will be identical and the current inrushes between the phases will be zero.

When the breaker SB of the pair P linked to the terminal B toggles into the isolated state, the input capacitor $Cf_1$ is placed in parallel with the output capacitor $Cs_1$ via the breakers ST and $ST_1$ placed simultaneously in an on state, forming the second network of the capacitors comprising the input capacitor $Cf_1$ in parallel with the output capacitor $Cs_1$. These two capacitors therefore have the same charge voltage $VCf_1 = VCs_1$ and their charge potentials will not vary during the next phase if the value of these capacitors is sufficient.

The two capacitors are charged to the same potential Vin/2, between the terminal A and the output terminal C across the inductor.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The invention will be better understood with the aid of exemplary embodiments according to the invention, with reference to the appended drawings, in which:

FIGS. 1b, 1c, 1d and 1e show control state charts for the series chopper of FIG. 1a;

FIG. 2d shows the configuration of the capacitors of the chopper in the state of FIG. 2a;

FIG. 3b shows the configuration of the capacitors of the chopper in the state of FIG. 3a;

FIGS. 4b and 4c show the control signals for the chopper of FIG. 4a;

FIG. 4d shows the configuration of the capacitors of the chopper in the state of 4a;

FIG. 5b shows the configuration of the capacitors of the chopper in the state of FIG. 4a;

FIG. 6b shows the configuration of the capacitors of the chopper of FIG. 6a;

FIG. 7b shows the configuration of the capacitors of the chopper of FIG. 7a;

DETAILED DESCRIPTION OF THE INVENTION

Figure 2A:
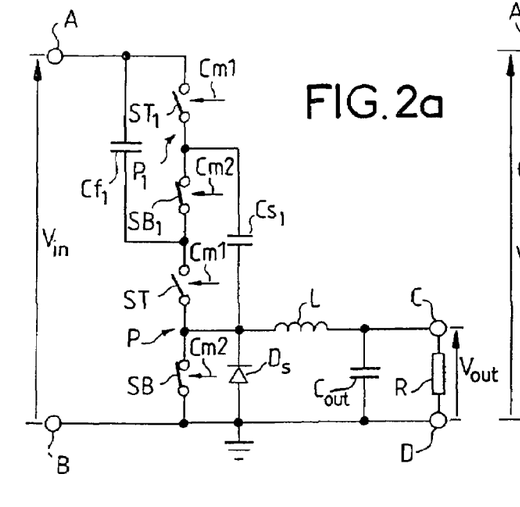
FIG. 2a shows a basic diagram of a chopper according to the invention comprising two pairs of breakers during the time Toff.

FIG. 2a shows a basic diagram of a series chopper according to the invention comprising two pairs of MOS transistors in series acting as breakers.

The series chopper of FIG. 2a comprises the pair P, having the two transistors SB and ST, in series with an additional pair $P_1$, comprising two other transistors $SB_1$ and $ST_1$. The transistors of the two pairs in series are connected in series between the two input terminals A and B of the chopper receiving the supply voltage Vin, the transistor SB being linked to the terminal B and the transistor $ST_1$ to the terminal A.

The transistors ST and $ST_1$ comprise a control input Cm1 placing the transistors simultaneously either into an on state (breaker closed) by application to its input of the first control signal s1 in a high state, or into an isolated state (breaker open) by the application of the second control signal s2 in a low state. The transistors SB and $SB_1$ comprise a control input Cm2, not overlapping the first control signal Cm1, placing the transistors simultaneously either into an on state (breaker closed) by application to its input of the third control signal s3 in a high state, or into an isolated state (breaker open) by the application to its input of the fourth control signal s4 in a low state. The chopper comprises the two output terminals C and D for connecting a load R, the output terminal D being linked to the input terminal B. The output terminal C is linked to the point of connection between the two breakers SB and ST in series of the pair B across the inductor L. The diode Ds in parallel with the transistor SB ensures the continuity of the current in the choke L during switchings and ensures low switching losses.

A capacitor Cout in parallel with the load R decreases the ripple of the output voltage Vout and together with the inductor makes it possible to carry out the filtering (recovery of the mean value) of the potential present of the other input of the inductor.

The chopper of FIG. 2a comprises, furthermore, an input capacitor $Cf_1$ and an output capacitor $Cs_1$, the input capacitor $Cf_1$ being connected on the one hand, to the input terminal A and, on the other hand, to the point of connection between the transistors ST and $SB_1$ of the two pairs P and $P_1$. The output capacitor $Cs_1$ is connected on the one hand, to the point of connection between the transistors $SB_1$ and $ST_1$ of the additional pair $P_1$ and, on the other hand, to the point of connection between the two transistors SB and ST of the pair P and the inductor L.

Figure 2B:
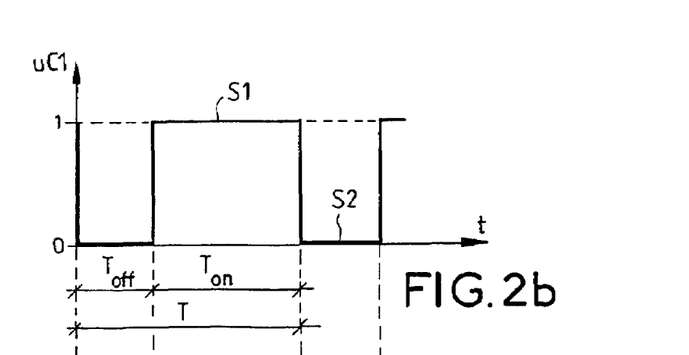
FIGS. 2b and 2c show the control signals for the chopper of FIG. 2a; (uc1 being the control for Cm1 and uc2 the control for Cm2)
Figure 2C:
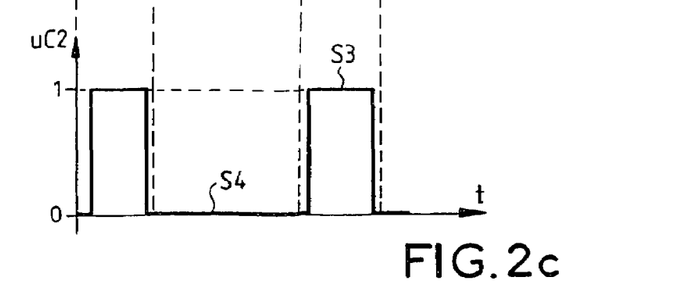

We shall subsequently explain the manner of operation of the series chopper of FIG. 2a according to the invention. FIGS. 2b and 2c show the control signals s1, s2, s3, s4 for the transistors. A voltage uc1 comprising the two control signals s1 and s2 applied to Cm1 and another voltage uc2 comprising the other two control signals s3 and s4 applied to Cm2. Cm1 and Cm2 being respectively the control inputs of the breakers ST and $ST_1$, and of the breakers SB and $SB_1$.

It will be considered that, when a control signal uc1 or uc2 is in the high state (1 in the chart) the transistor is placed in the on state, and when it is in the low state (0 in the chart), the transistor is placed in the isolated state. It is considered that the frequency of the signals is constant, with period T, the two controls must be nonoverlapping and the duty ratio of uc1 is Ton/T (see FIG. 1b). We shall consider only the control signal uc1 to distinguish the operating phases since the diode in parallel with the breakers SB and $SB_1$ makes it possible to regard the breakers SB and $SB_1$ as being on as soon as Uc1 is in the low state.

FIG. 2a shows the state of the breakers during the time interval Toff, ST and $ST_1$ are open and SB and $SB_1$ are closed (or regarded as closed by virtue of the parallel diode).

Figure 2D:
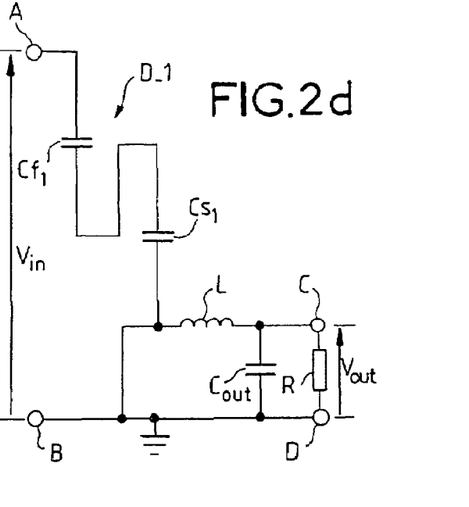

The diagram of the chopper during this time interval Toff is shown in FIG. 2d. During the time Toff, the capacitors $Cf_1$ and $Cs_1$ are connected in series, between the input terminals A and B, by the closing of the breakers SB and $SB_1$ and form a capacitive divider that makes it possible to obtain a voltage for charging these capacitors to Vin/2 at the start of the phase by virtue of the following relations:

$$VCf_1 + VCs_1 = Vin$$

And $VCf_1 = VCs_1$ a consequence of the following phase.

This relation can be regarded as conserved or as varying little if the values of the capacitors are sufficient and the frequencies high.

During this phase, the input point of the inductor (which corresponds to the input point of the output inductor filter output capacitor is at the zero potential.

Figure 3A:
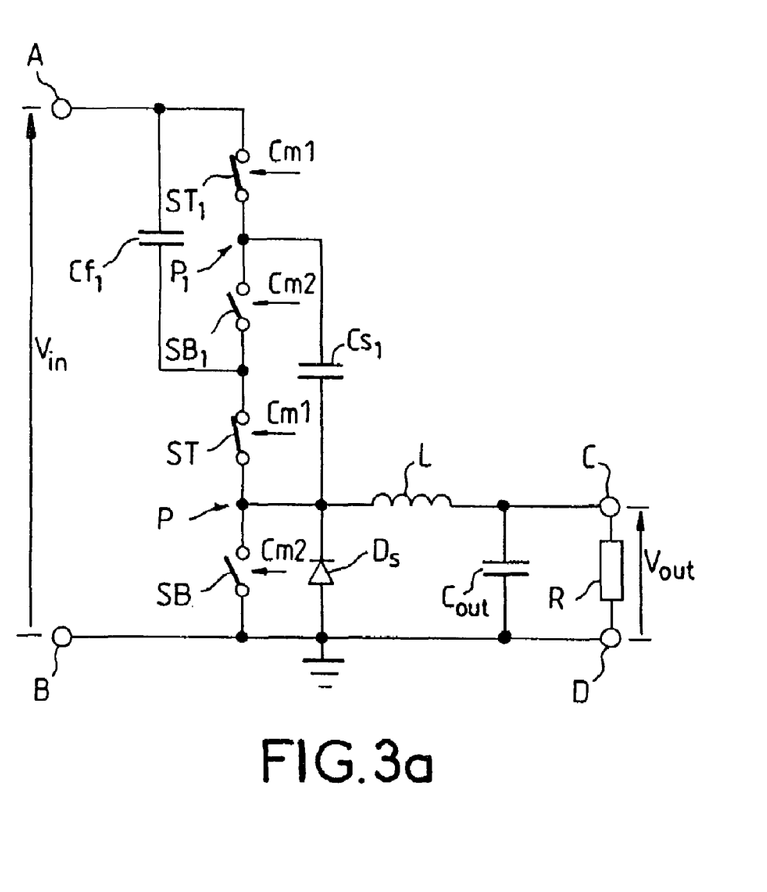
FIG. 3a shows the chopper of FIG. 2a during the time Ton.

FIG. 3a shows the chopper of FIG. 2a during the time Ton.

During this time interval Ton, the breakers ST and $ST_1$ are closed and the breakers SB and $SB_1$ are open.

Figure 3B:
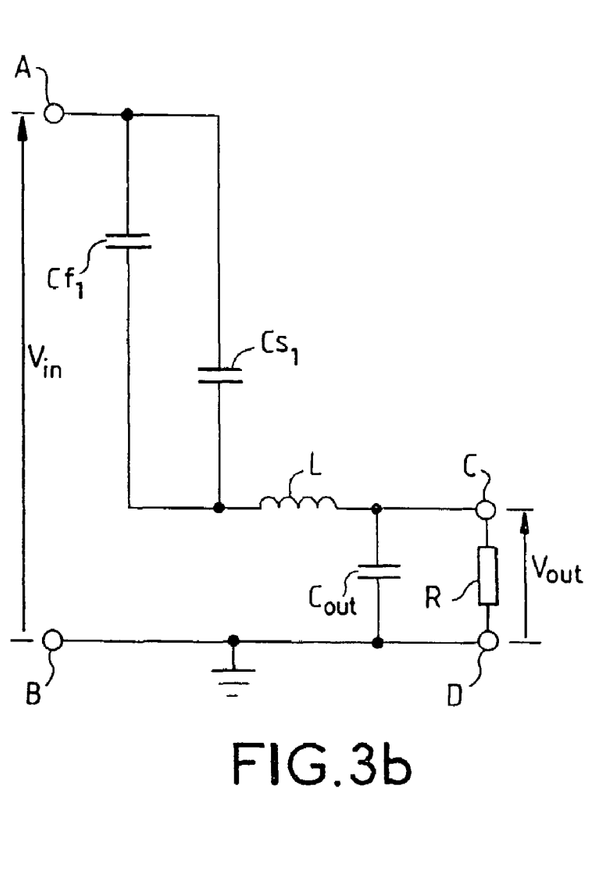

FIG. 3b shows the configuration of the capacitors of the chopper, in the state of FIG. 3a, during the time Ton. During the time Ton, the capacitors Cf1 and Cs1 are in parallel and connected between the input terminal A and the output terminal C across the inductor L.

Hence these capacitors are found to have the same voltage at their terminals: $VCf_1 = VCs_1$ The two capacitors retain the same charge voltage during this phase and if the values of the capacitors are sufficient (variation of charge over mean charge voltage small) it may be considered that the mean voltage of Vin/2 is retained.

The relation between the current Ic and the voltage Vc across the terminals of a capacitor C may be written:

$$Ic = C \cdot \frac{d}{dt} Vc \qquad (1)$$

with Vc voltage across the terminals of the capacitor C.

By integrating relation (1), it is possible to write the simplified relation:

$$\frac{\Delta Vc}{\Delta t} = \frac{Ic}{C}$$

This relation shows that if the capacitance is big enough and the time Δt short enough, the voltage across the termi-nals of the capacitors has small variations. The bigger the currents passing through them, the bigger the values of the capacitors must be.

The value of the capacitors also depends on the time Ton. The smaller the value of Ton, the more limited the value of the capacitor may be.

If the value of the capacitors is sufficient, it is possible to write that the voltage across the terminals of the capacitors is constant during this time period Ton:

$$VCf1 = VCs1 = \frac{Vin}{2} \qquad (2)$$

The relation at the input of the inductor is then Vin/2.

Hence during a time Toff, the voltage at the input of the inductor is zero and during a time Ton the voltage at the input of the inductor is Vin/2. The output capacitance and inductance filter makes it possible to recover the mean value of the porches present at the input of the inductor and hence one finds the expression linking the input voltage to the output voltage:

$$Vout = \frac{Ton}{T} \cdot \frac{Vin}{2} \qquad (3)$$

If the relation $Cf_1 = Cs_1$ holds, then the power distribution of the two stages is balanced, the current inrushes between the phases are limited since the charge variations during the phases are identical.

The capacitors $Cf_1$ and $Cs_1$ are in parallel and the currents passing through them, respectively Icf1 and ICs1 are equal. Furthermore, the current I through the choke L being continuous (no possibility of having abrupt variations across a choke), one deduces therefrom the relation $$Icf_1 = Ics_1 = I/2 \qquad (4)$$

This relation shows that each stage will deliver half the power and that half the current will pass through it.

The above approach can be repeated for the converter with three pairs of breakers.

Figure 4A:
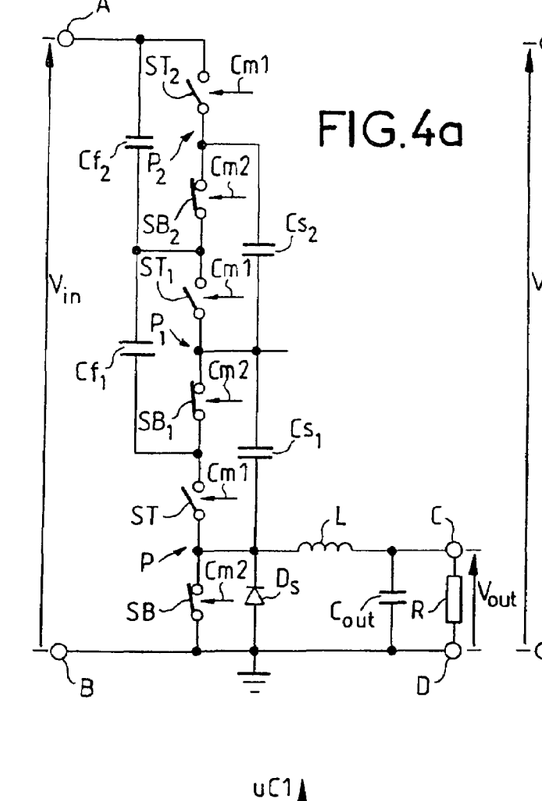
FIG. 4a shows a basic diagram of a chopper according to the invention comprising three pairs of breakers during the time Toff.
Figure 5A:
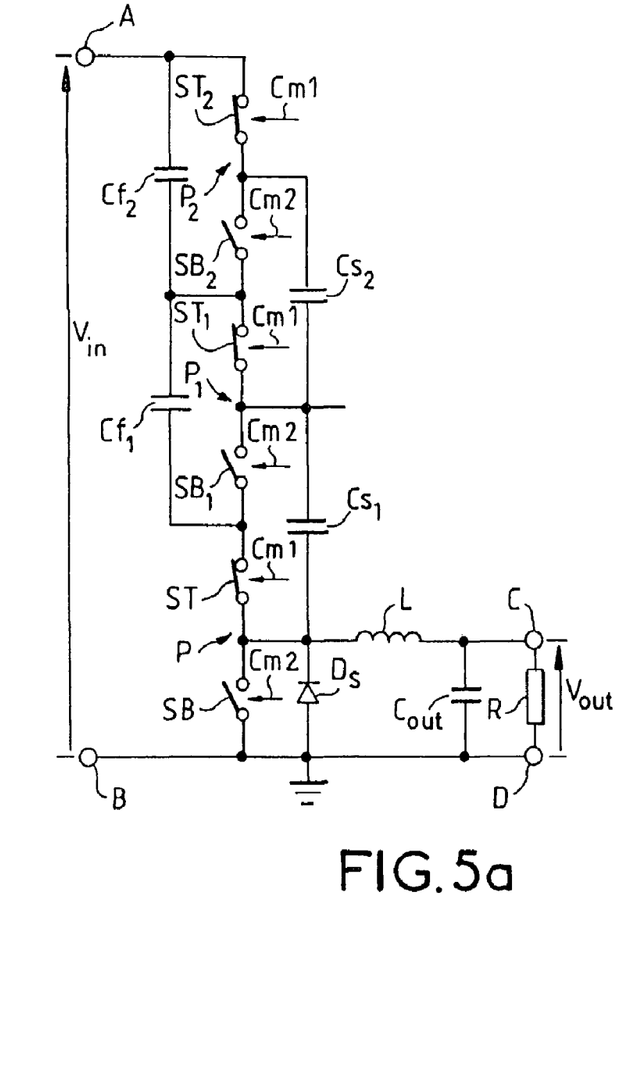
FIG. 5a shows the chopper of FIG. 4a during the time Ton.

FIGS. 4a and 5a show the configuration of a "buck" with 3 pairs of breakers. These figures permit a better understanding of the approach toward generalization.

FIG. 4a shows a basic diagram of a series chopper according to the invention comprising three pairs of MOS transistors in series acting as breakers.

The series chopper of FIG. 4a comprises the pair P, having the two transistors SB and ST, in series with two additional pairs $P_1$ and $P_2$, comprising four other transistors $SB_1$, $ST_1$ and $SB_2$, $ST_2$. The transistors of the three pairs in series are connected in series between the two input terminals A and B of the chopper receiving the supply voltage Vin, the transistor SB being linked to the terminal B and the transistor $ST_2$ to the terminal A. The transistors $SB_1$ and $SB_2$ must comprise a parallel diode, the cathode of these diodes having to be linked respectively to the common point of $ST_1$ and $SB_1$ and to the common point of $ST_2$ and $SB_2$. These diodes may be the intrinsic diodes of the components used.

The transistors ST, $ST_1$ and $ST_2$ comprise control inputs Cm1 placing either the transistors simultaneously in an on state (breaker closed) by application to its input of the control signal in a high state, or into an isolated state (breaker open) by the application to its input of a control signal in a low state. The transistors SB $SB_1$ and $SB_2$ comprise control inputs Cm2, with control signals not overlapping the control signals of Cm1, placing either the transistors simultaneously in an onstate (breaker closed) by application to its input of the control signal in a high state, or into an isolated state (breaker open) by the application to its input of a control signal in a low state.

The chopper comprises the two output terminals C and D for connecting a load R, the output terminal D being linked to the input terminal B. The output terminal C is linked to the point of connection between the two breakers SB and ST in series of the pair B across the inductor L. The diode Ds in parallel with the transistor SB ensures the continuity of the current in the choke L during switchings and ensures low switching losses. A capacitor Cout in parallel with the load R decreases the ripple of the output voltage Vout and together with the inductor makes it possible to carry out the filtering (recovery of the mean value) of the potential present on the other input of the inductor.

The chopper of FIG. 4a comprises, furthermore, two input capacitors $Cf_1$ and $Cf_2$ and two output capacitors $Cs_1$ and $Cs_2$, the input capacitors Cf1 and $Cf_2$ being connected on either side of the pairs of breakers $P_1$ and $P_2$. The output capacitor $Cs_1$ is connected on the one hand, to the point of connection between the transistors $SB_1$ and $ST_1$ of the additional pair $P_1$ and, on the other hand, to the point of connection between the two transistors SB and ST of the pair P and the inductor L. The output capacitor Cs2 is connected between the point of connection between the transistors $SB_2$ and $ST_2$ of the additional pair $P_2$ and on the other hand, to the point of connection between the two transistors $SB_1$ and $ST_1$ of the pair $P_1$.

Figure 4B:
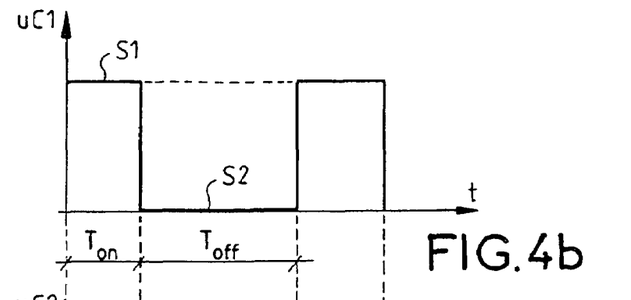
Figure 4C:
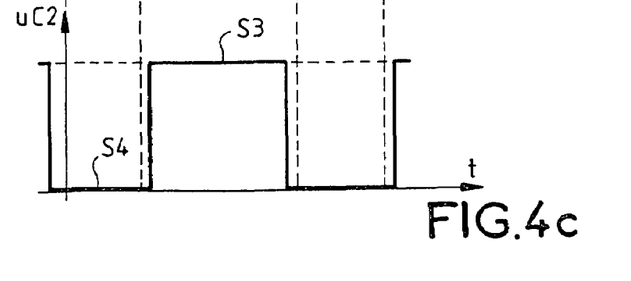

We shall subsequently explain the manner of operation of the series chopper of FIG. 4a according to the invention. FIGS. 4b and 4c show two control signals uc1 and uc2 applied to Cm1 and Cm2 respectively, one uc1 to the control input of the breakers ST, $ST_1$ and $ST_2$, the other uc2 to the control input of the breakers SB, $SB_1$ and $SB_2$ for the transistors.

It will be considered that, when a control signal uc1 or uc2 is in the high state (1 in the chart) the transistor is placed in the on state, and when it is in the low state (0 in the chart), the transistor is placed in the isolated state. It is considered that uc1 and uc2 are fixed-frequency signals of period T, the two controls must be nonoverlapping and the duty ratio of uc1 is Ton/T. We shall consider only the control signal uc1 to distinguish the operating phases since the diode in parallel with the breakers SB, $SB_1$ makes it possible to regard the breakers SB, $SB_1$ and $SB_2$ as being on as soon as uc1 is in the low state.

FIG. 4a shows the state of the breakers during the time interval Toff, ST, $ST_1$ and $ST_2$ are open and SB, $SB_1$ and $SB_2$ are closed (or regarded as closed by virtue of the parallel diode).

Figure 4D:
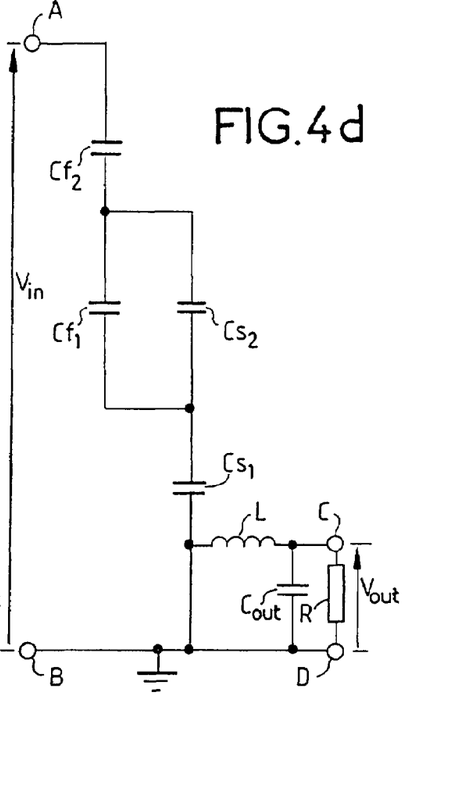

The diagram of the chopper during this time interval Toff is shown in FIG. 4d. During the time Toff, a network of capacitors in series is formed of $Cf_2$, $Cf_1$ in parallel with $Cs_2$ and $Cs_1$ connected, between the input terminals A and B, by the closing of the breakers SB, $SB_1$ and $SB_2$. This network forms a capacitive divider that makes it possible to obtain a voltage for charging these capacitors to Vin/3 at the start of the phase by virtue of the following relations:

$VCf_2 + VCf_1 + VCs_1 = Vin$

And $VCf_2 = VCf_1 = VCs_1$ a consequence of the following phase.

This relation can be regarded as conserved or as varying little if the values of the capacitors are sufficient and the frequencies high.

During this phase, the input point of the inductor (which corresponds to the input point of the output inductor filter output capacitor is at the zero potential.

FIG. 5a shows the chopper of FIG. 4a during the time Ton.

During this time interval Ton, the breakers ST, $ST_1$ and $ST_2$ are closed and the breakers SB, $SB_1$ and $SB_2$ are open.

Figure 5B:
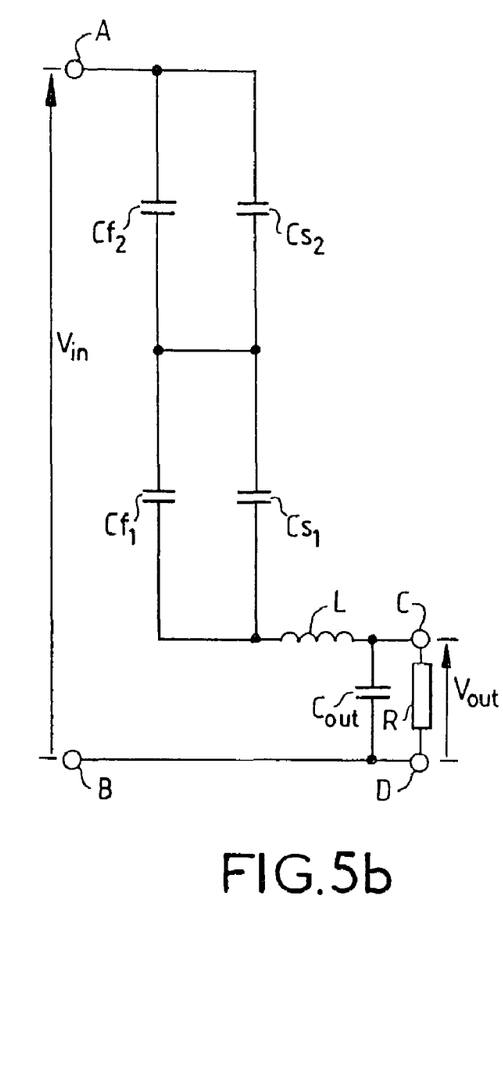

FIG. 5b shows the configuration of the capacitors of the chopper, in the state of FIG. 4a, during the time Ton. During the time Ton, a network of capacitors formed by the capacitors $Cf_1$ and $Cs_2$ in parallel, in series with the capacitors $Cf_2$ and $Cs_2$ in parallel, is connected between the input terminal A and the output terminal C across the inductor L.

Hence these capacitors are found to have the same voltage across their terminals: $VCf_1 = VCs_1$ and $VCf_2 = VCs_2$ The four capacitors retain the same charge voltage during this phase and if the values of the capacitors are sufficient (variation of charge over mean charge voltage small) it may be considered that the mean voltage of Vin/3 is retained.

The relation between the current Ic and the voltage Vc across the terminals of a capacitor C may be written:

$$Ic = C \cdot \frac{d}{dt} Vc$$

with Vc voltage across the terminals of the capacitor C.

By integrating relation (1), it is possible to write the simplified relation:

$$\frac{\Delta Vc}{\Delta t} = \frac{Ic}{C}$$

This relation shows that if the capacitance is big enough and the time $\Delta t$ short enough, the voltage across the terminals of the capacitors has small variations.

If the value of the capacitors is sufficient, it is possible to write that the voltage across the terminals of the capacitors is constant during this time period Ton:

$$VCf1 = VCs1 = VCf2 = VCs2 = \frac{Vin}{3} \quad (6)$$

The relation at the input of the inductor is then Vin/3.

Hence during a time Toff, the voltage at the input of the inductor is zero and during a time Ton the voltage at the input of the inductor is Vin/3. The output capacitance and inductance filter makes it possible to recover the mean value of the porches present at the input of the inductor and hence one finds the expression linking the input voltage to the output voltage:

$$Vout = \frac{Ton}{T} \cdot \frac{Vin}{3}$$

If the following relations hold
$Cf_2 = Cx$
$Cf_1 + Cs_2 = Cx$
$Cs_1 = Cx$ $Cf_1+Cs_1=Cy$
$Cf_2+Cs_2=Cy$ Then the power distribution of the three stages is balanced, the current inrushes between the phases are limited since the charge variations during the phases are identical.

Remark: solving the above equation system gives the following results:

$Cf_2=Cx, Cs_1=Cx, Cf_1=Cx/2, Cs_2=Cx/2, Cy=(3/2)*Cx$

Figure 6A:
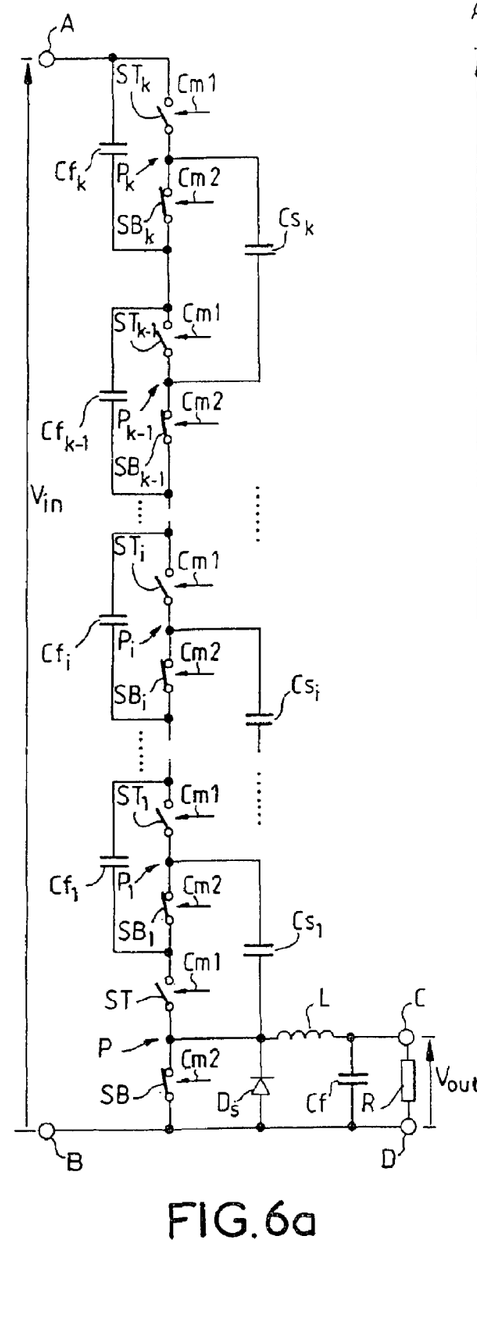
FIG. 6a shows the general configuration of a series chopper with N pairs of breakers during the time Toff.
Figure 7A:
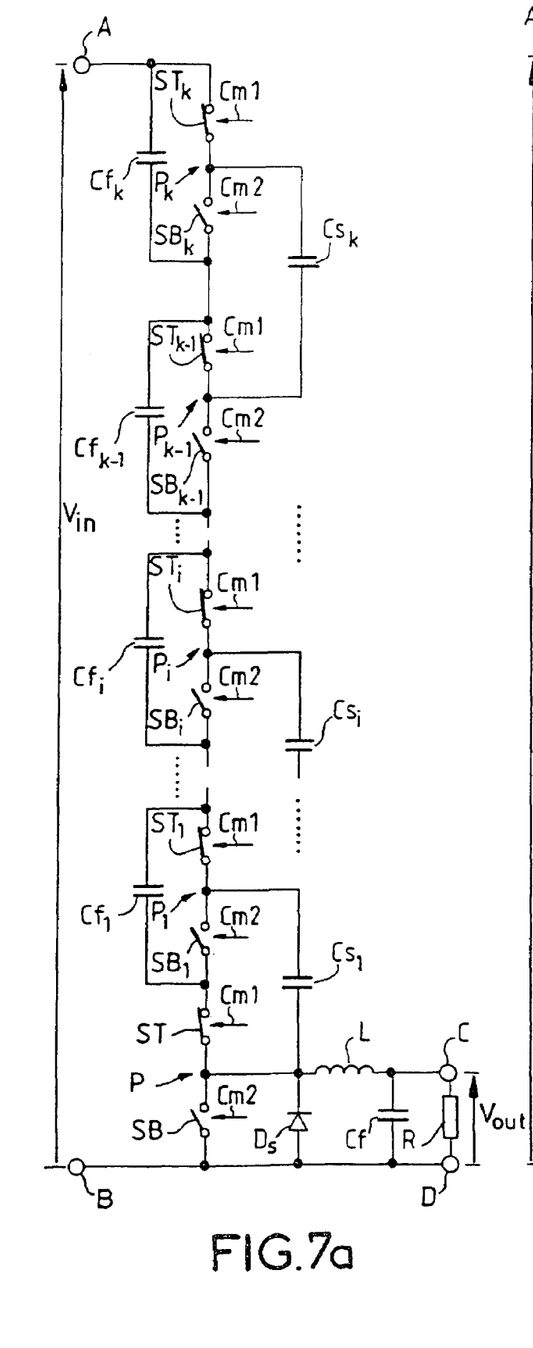
FIG. 7a shows the general configuration of a series chopper with N pairs of breakers during the time Ton.

FIGS. 6a and 7a show the general configuration of a "buck converter" with N pairs of breakers, i.e. a first pair P and K additional pairs $P_i$ of breakers, respectively during the time Toff and the time Ton.

Figure 6B:
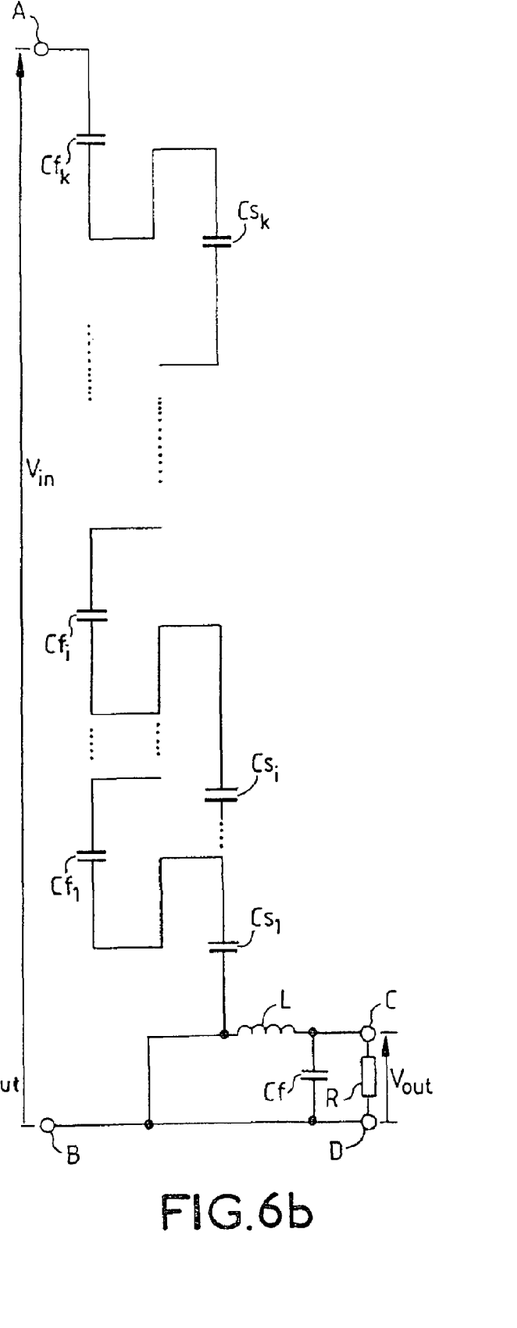
Figure 7B:
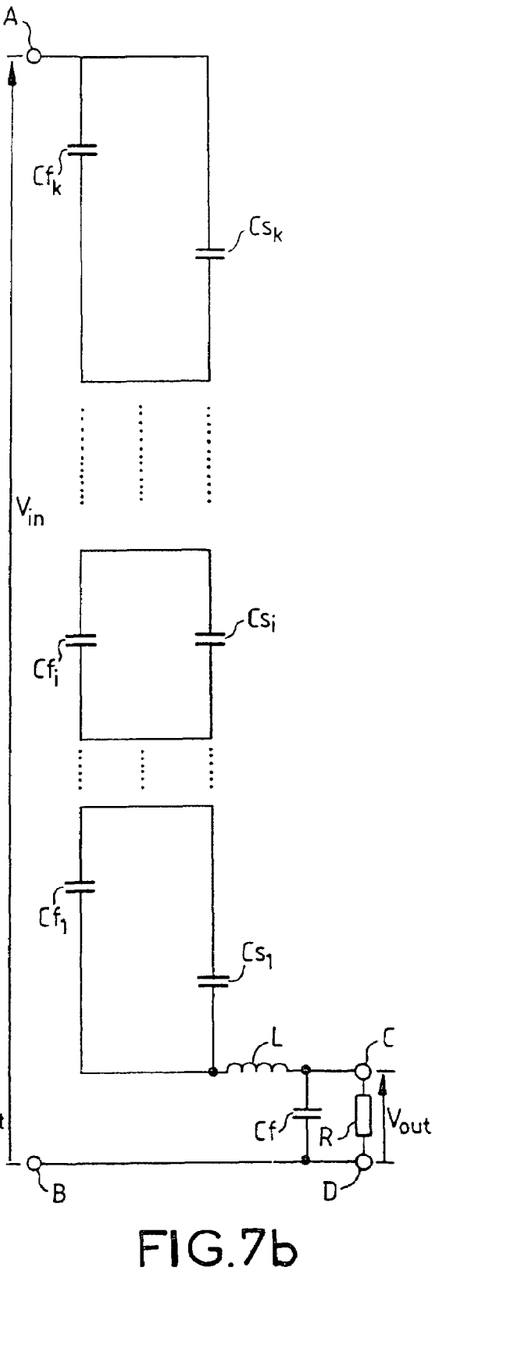

FIGS. 6b and 7b show the configuration of the networks of input capacitors Cfi and of output capacitors Csi during these two times Toff and Ton.

In these configurations of FIGS. 6a and 7a, an input capacitor of rank i, Cfi, with i=1, 2, . . . K, finds itself connected in parallel with a pair of breakers in series of like rank i i.e. the breakers $SB_1$ and $ST_1$ and an output capacitor of like rank i, Csi, finds itself connected between the points of connection of the two breakers STi and SBi of the pair Pi and the point of connection of the two breakers STi-1 and STi-1 of the previous pair.

FIG. 6b shows the general configuration of the capacitors during the time Toff of the chopper of FIG. 6a. During this time a first network of $D_k$ capacitive dividers, comprising the capacitors $Cf_k$, $Cf_{k-1}$ in parallel with $Cs_k$, . . . , $Cf_i$ in parallel with $Cs_{i+1}$, . . . , Cf1 in parallel with $Cs_2$ et Cs, is formed (with i=1, 2, . . . . K) by the state configuration of the breakers of FIG. 4a, the breakers SB with the breakers $SB_i$ being in the on state and the breaker ST with the breakers $ST_i$ being in the isolated state.

The voltage across the terminals of the input capacitor Cfi becomes:

VCfi=Vin/(K+1), or expressed with N, VCfi=Vin/(N)

This relation is the consequence of the phase which will be described later and where it is shown that the voltages VCfi=VCsi (with i=1, 2 . . . . K).

The voltage across the terminals of each stage of each pair of transistors becomes the input voltage divided by N.

During this phase, the input point of the inductor (which corresponds to the input point of the output inductor filter output capacitor is at the zero potential.

FIG. 7b shows the general configuration of the capacitors during the time Ton of FIG. 7a. During this time Ton, these other K additional pairs $P_i$ of breakers form when they are switched with the capacitors a second network of capacitors comprising the capacitors in series in the following manner: Cfk in parallel with Csk in series with . . . Cfi in parallel with Csi (with i=1, 2 . . . K), . . . in series with Cf1 in parallel with Cs1.

The voltages between the capacitors Cfi and Csi are therefore identical.

The input capacitors Cfi and output capacitors Csi are, charged to the potential Vin/K+1.

If the value of the capacitors is sufficient not to undergo large decreases of charge then it will be considered that the voltages VCfi and VCsi are conserved during the operating period.

The energy is delivered by each stage to the choke across the capacitors.

The voltage at the input of the choke is then Vin/N for the duration Ton.

The assembly consisting of the inductor and output capacitor plays a filtering role which will average the two phases.

It is then possible to express the output voltage as a function of the input voltage:

$$Vout = \frac{Ton}{T} \cdot \frac{Vin}{N}$$

An optimization of the structure will be achieved if the following relations hold:

The values given to the capacitors may be such that:
$Cf_k=Cx$
$Cf_{k-1}+Cs_k=Cx$
. . .
$Cf_i+Cs_{i+1}=Cx$
. . .
$Cf_1+Cs_2=Cx$
$Cs_1=Cx$
$Cf_k+Cs_k=Cy$
$Cf_{k-1}+Cs_{k-1}=Cy$
. . .
Cfi+Csi=Cy
. . .
$Cf_1+Cs_1=Cy$ If we append the equation system defined above, the system obtained comprises 2K+1 equations and 2K+2 unknowns (Cx and Cy being unknowns on which there are no other particular constraints). This system can be solved and the values of the capacitors can be expressed as a function of a single variable Cx which may be fixed as a function of the energy to be delivered.

This system, if it is satisfied, makes it possible to limit the current inrushes between the phases, so that the same power is delivered to each stage.

The series chopper according to the invention makes it possible to obtain better efficiency than with the choppers of the prior art with one stage or two stages in cascade by virtue of a less constraining dimensioning of the components (less component stress). Furthermore, the structure according to the invention makes it possible to increase the operating frequencies so as to reduce the size of the converters.

In practice, in the case of a series chopper with two stages according to the invention, the gain in efficiency relative to a chopper with one stage is greater than 4%, this translating into a typical reduction in the losses of 30 to 50%. Furthermore, the decrease in the current in the output capacitors $Cs_i$ and the possibility of increasing the operating frequency of the chopper make it possible to use capacitors of lower values. The stress of the components is decreased. Specifically the currents provided by the input capacitors are smaller than in a conventional step-down converter, the inductor sees voltage differences across these terminals of smaller amplitudes thereby reducing the electromagnetic emissions, the breakers have smaller voltage differences than when there is a single stage and the currents passing through them are smaller. Moreover, structures which could not be envisaged before (conversion from high voltage (greater than 200V) to 28 V for example) since the components (diodes or MOSs which were too stressed become so because the low stress makes it possible to select more optimized components. For example, schoftky diodes may be selected in place of conventional diodes (schottky diodes are limited in terms of maximum breakdown voltage and are of higher performance than conventional diodes).

The invented structure has the advantage of starting up correctly. Specifically, before the start-up phase (no controls operating the breakers), when the input voltage is applied, the capacitors charge naturally by virtue of the diodes on the breakers $SB_1$. As soon as the breakers are first operated, the output voltage is established with no start-up problems. The output capacitance is generally less than the capacitances Cfi and Csi.

Figure 8A:
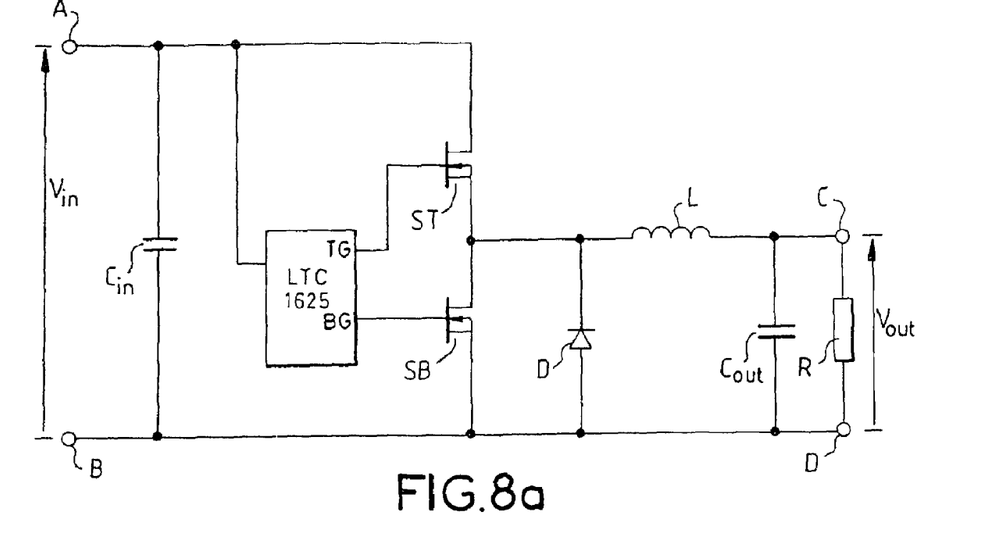
FIG. 8a shows a structure of series choppers controlled by a commercially available controller.
Figure 8B:
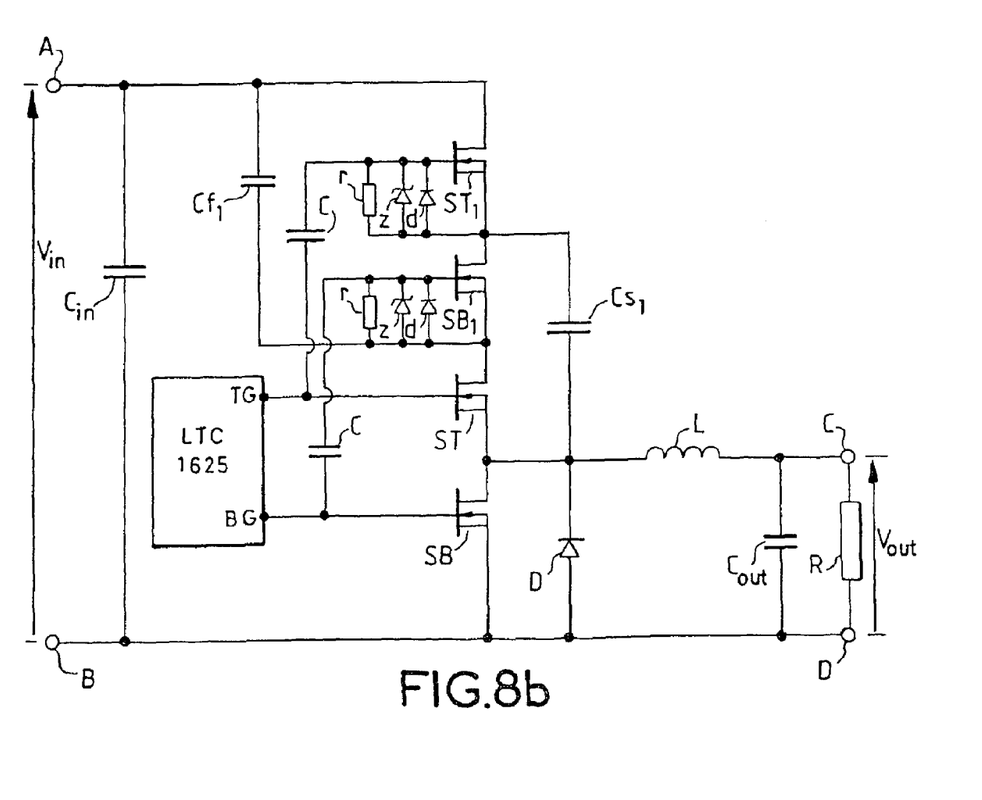
FIG. 8b shows the modifications to be made in order to go over to a structure with two pairs of breakers.

FIGS. 8a and 8b show how to go over from a commercially available structure offered by a manufacturer of LINEAR TECHNOLOGY PWM controllers with the LTC 1625 component to the 2-stage structure simply by adding a control shifter system also known as a "level shifter".

FIG. 8a shows the simplified diagram proposed by LINEAR TECHNOLOGY (only the power structure and the controls for the breakers are of interest). The breakers SB, ST are MOSs. The LTC 1625 circuit comprises two control outputs BG and TG respectively driving the gate of MOS SB and ST providing the signals necessary for operation.

FIG. 8b proposes the modifications to be made in order to go over to a structure with two stages (two pairs of breakers) and the associated operating control. The structure comprises four MOSs SB, ST, $SB_1$ and $ST_1$. This operating control can be generalized to N stages. It suffices to add a capacitor C between the operating controls of the MOSs for SB and $SB_i$ and for ST and $ST_1$, and a resistor r, a diode d and a zener z in parallel between the gates and sources of the MOSs of the added stage.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A series chopper comprising:
   a pair of input terminals A and B for connecting a DC input voltage Vin between these terminals, the potential of the terminal A being greater than the potential of the terminal B;
   a pair P of breakers SB, ST in series connected by the breaker SB to the input terminal B, ST comprising a control input Cm1 for setting ST either into an on state by the application to its input of the control of a first control signal s1 or into an isolated state by application to its control input of a second control signal s2, SB comprising a control input Cm2 for setting SB either into an on state by the application to its control input of a third control signal s3, or into an isolated state by application to its control input of a fourth control signal s4,
   a pair of output terminals C and D, for supplying, with an output voltage Vout, a load R in parallel with a filtering capacitor Cout, the output terminal D being connected to the input terminal B and the output terminal C to the point of connection between the two breakers SB and ST in series across an inductor L, the pair of output terminals, wherein:
   K other additional pairs Pi of breakers in series between the input terminal A and the free side of the breaker ST comprising the same control inputs Cm1 and Cm2, with i=1, 2 . . . K., each pair Pi comprising two breakers SBi and STi in series, the breaker SBi of each pair of breakers comprising a diode in parallel the cathode of the diode having to be on the common point of STi and SBi;
   K input capacitors $Cf_i$ in series connected to the K pairs of breakers with i=1, 2 . . . K., each capacitor $Cf_i$ being connected on both sides of the pair of breakers Pi;
   K output capacitors $Cs_i$ in series, each output capacitor $Cs_i$ being connected between the common point of the breakers of the pair $P_i$ and the common point of the breakers of the previous pair $P_{i-1}$, with i=1, 2, . . . K, (when i=1, $P_{i-1}=P_0=P$), the breakers of these other additional pairs being operated simultaneously by the first and second signals applied to Cm1 and by the third and fourth signals applied to Cm2 forming, when the breaker is operated to the isolated state, a first network of capacitors, connected between the terminal A and the terminal B, comprising in series $Cf_k$, $Cf_{k-1}$ in parallel with $Cs_k$, . . . , $Cf_i$ in parallel with $Cs_{i+1}$, . . . , $Cf_1$ in parallel with $Cs_2$ and $Cs_1$ and when the breaker of the pair is operated into the on state, these other pairs of breakers forming a second network of capacitors connected between the terminal A and the inductor (L), comprising in series $Cf_k$ in parallel with $Cs_k$, . . . $Cf_i$ in parallel with $Cs_i$, . . . $Cf_1$ in parallel with $Cs_1$.

2. The series chopper as claimed in claim 1, wherein the voltage Vout at the output of the chopper, dependent on the duty ratio Ton/T, is given by the relation:

$Vout=Vin.(Ton/T).1/(K+1)$

3. The series chopper as claimed in claim 2, wherein said series chopper can be optimized if the following relations hold between the capacitances:
   $Cf_k=Cx$
   $Cf_{k-1}+Cs_k=Cx$
   $Cf_i+Cs_{i+1}=Cx$ . . .
   $Cf_1+Cs_2=Cx$
   $Cs_1=Cx$
   $Cf_k+Cs_k=Cy$
   $Cf_{k-1}+Cs_{k-1}=Cy$
   . . .
   $Cfi+Csi=Cy$ . . .
   $Cf_1+Cs_1=Cy$
   Cx and Cy being values of capacitances to be defined, the system of 2 K+1 equations in to 2K+2 unknowns being solvables by retaining a degree of freedom in the choice of C, Cx being determined so that the voltages on the capacitors may be regarded as constant.

4. The series chopper as claimed in claim 3, wherein the relations:
   $Cf_k=Cx$
   $Cf_{k-1}+Cs_k=Cx$
   . . .
   $Cf_i+Cs_{i+1}=Cx$ . . .
   $Cf_1+Cs_2=Cx$
   $Cs_1=Cx$
   $Cf_k+Cs_k=Cy$
   $Cf_{k-1}+Cs_{k-1}=Cy$
   . . .
   $Cfi+Csi=Cy$ . . .
   $Cf_1+Cs_1=Cy$ can be put into the form of matrix equations or the capacitors Csi and Cfi are functions of Cx.

5. The series chopper as claimed in claim 1, wherein the series chopper comprises a single other additional pair $P_1$ (K=1) of breakers $SB_1$ and $ST_1$ in series with the pair P, ST being connected to $SB_1$ the input capacitor $Cf_1$ being connected on the one hand, to the input terminal A and, on the other hand, to the point of connection between the transistors ST and $SB_1$ and of the two pairs P and $P_1$ the output capacitor $Cs_1$ being connected on the one hand, to the point of connection between the transistors $SB_1$ and $ST_1$ of the additional pair $P_1$ and, on the other hand, to the point of connection between the two transistors SB and ST of the pair P and the inductor L, the capacitance of $Cf_1$ being equal to the capacitance of $Cs_1$.

6. The series chopper as claimed in claim 1, wherein the series chopper comprises two additional pairs $P_1$ and $P_2$ of breakers in series $SB_1$, $ST_1$, and $SB_2$, $ST_2$ with the breaker pair P, the transistors of the three pairs in series being connected in series between the two input terminals A and B of the chopper receiving the supply voltage Vin, the transistor SB being linked to the terminal B and the transistor $ST_2$ to the terminal A, in that it furthermore comprises two input capacitors $Cf_1$ and $Cf_2$ and two output capacitors $Cs_1$ and $Cs_2$, the input capacitors Cf1 and $Cf_2$ being connected on either side of the pairs of breakers $P_1$ and $P_2$, the output capacitor $Cs_1$ being connected on the one hand, to the point of connection between the transistors $SB_1$ and $ST_1$ of the additional pair $P_1$ and on the other hand, to the point of connection between the two transistors SB and ST of the pair P and the inductor L, the output capacitor Cs2 being connected between the point of connection between the transistors $SB_2$ and $ST_2$ of the additional pair $P_2$ and on the other hand, to the point of connection between the two transistors $SB_1$ and $ST_1$ of the pair $P_1$.

7. The series chopper as claimed in claim 1, wherein the diode in parallel with each breaker $SB_i$ can be the intrinsic diode of the component used.

8. The series chopper as claimed in claim 1, wherein the control inputs Cm1 and Cm2 of the breakers are not at any moment operated simultaneously into the on state.

9. The series chopper as claimed in claim 1, wherein it comprises a filtering capacitor (Cout) between the output terminals C and D.

10. The series chopper as claimed in claim 1, wherein the breakers are MOS transistors.

11. The series chopper as claimed in claim 1, wherein the controls of the MOSs are of the control shifter or "level shifter" type, the controls being shifted, by adding between the controls of the MOSs a capacitor C and in parallel between the gates and sources of the MOSs of the added stage a resistor r, a diode d and a zener z.

12. The series chopper as claimed in claim 4, wherein the series chopper comprises a single other additional pair $P_1$ (K=1) of breakers $SB_1$ and $ST_1$ in series with the pair P, ST being connected to $SB_1$ the input capacitor $Cf_1$ being connected on the one hand, to the input terminal A and, on the other hand, to the point of connection between the transistors ST and $SB_1$ and of the two pairs P and $P_1$ the output capacitor $Cs_1$ being connected on the one hand, to the point of connection between the transistors $SB_1$ and $ST_1$ of the additional pair $P_1$ and, on the other hand, to the point of connection between the two transistors SB and ST of the pair P and the inductor L, the capacitance of $Cf_1$ being equal to the capacitance of $Cs_1$.

13. The series chopper as claimed in claim 4, wherein the series chopper comprises two additional pairs $P_1$ and $P_2$ of breakers in series $SB_1$, $ST_1$ and $SB_2$, $ST_2$ with the breaker pair P, the transistors of the three pairs in series being connected in series between the two input terminals A and B of the chopper receiving the supply voltage Vin, the transistor SB being linked to the terminal B and the transistor $ST_2$ to the terminal A, in that it furthermore comprises two input capacitors $Cf_1$ and $Cf_2$ and two output capacitors $Cs_1$ and $Cs_2$, the input capacitors Cf1 and $Cf_2$ being connected on either side of the pairs of breakers $P_1$ and $P_2$, the output capacitor $Cs_1$ being connected on the one hand, to the point of connection between the transistors $SB_1$ and $ST_1$ of the additional pair $P_1$ and on the other hand, to the point of connection between the two transistors SB and ST of the pair P and the inductor L, the output capacitor Cs2 being connected between the point of connection between the transistors $SB_2$ and $ST_2$ of the additional pair $P_2$ and on the other hand, to the point of connection between the two transistors $SB_1$ and $ST_1$ of the pair $P_1$.

14. The series chopper as claimed in claim 3, wherein the series chopper comprises a single other additional pair $P_1$ (K=1) of breakers $SB_1$ and $ST_1$ in series with the pair P, ST being connected to $SB_1$ the input capacitor $Cf_1$ being connected on the one hand, to the input terminal A and, on the other hand, to the point of connection between the transistors ST and $SB_i$ and of the two pairs P and $P_1$ the output capacitor $Cs_1$ being connected on the one hand, to the point of connection between the transistors $SB_1$ and $ST_1$ of the additional pair $P_1$ and, on the other hand, to the point of connection between the two transistors SB and ST of the pair P and the inductor L, the capacitance of $Cf_1$ being equal to the capacitance of $Cs_1$.

15. The series chopper as claimed in claim 3, wherein the series chopper comprises two additional pairs $P_1$ and $P_2$ of breakers in series $SB_1$, $ST_1$ and $SB_2$, $ST_2$ with the breaker pair P, the transistors of the three pairs in series being connected in series between the two input terminals A and B of the chopper receiving the supply voltage Vin, the transistor SB being linked to the terminal B and the transistor $ST_2$ to the terminal A, in that it furthermore comprises two input capacitors $Cf_1$ and $Cf_2$ and two output capacitors $Cs_1$ and $Cs_2$, the input capacitors Cf1 and $Cf_2$ being connected on either side of the pairs of breakers $P_1$ and $P_2$, the output capacitor $Cs_1$ being connected on the one hand, to the point of connection between the transistors $SB_1$ and $ST_1$ of the additional pair $P_1$ and on the other hand, to the point of connection between the two transistors SB and ST of the pair P and the inductor L, the output capacitor Cs2 being connected between the point of connection between the transistors $SB_2$ and $ST_2$ of the additional pair $P_2$ and on the other hand, to the point of connection between the two transistors $SB_1$ and $ST_1$ of the pair $P_1$.

16. The series chopper as claimed in claim 2, wherein the series chopper comprises a single other additional pair $P_1$ (K=1) of breakers $SB_1$ and $ST_1$ in series with the pair P, ST being connected to $SB_1$ the input capacitor $Cf_1$ being connected on the one hand, to the input terminal A and, on the other hand, to the point of connection between the transistors ST and $SB_1$ and of the two pairs P and $P_1$ the output capacitor $Cs_1$ being connected on the one hand, to the point of connection between the transistors $SB_1$ and $ST_1$ of the additional pair $P_1$ and, on the other hand, to the point of connection between the two transistors SB and ST of the pair P and the inductor L, the capacitance of $Cf_1$ being equal to the capacitance of $Cs_1$.

17. The series chopper as claimed in claim 2, wherein the series chopper comprises two additional pairs $P_1$ and $P_2$ of breakers in series $SB_1$, $ST_1$ and $SB_2$, $ST_2$ with the breaker pair P, the transistors of the three pairs in series being connected in series between the two input terminals A and B of the chopper receiving the supply voltage Vin, the transistor SB being linked to the terminal B and the transistor $ST_2$ to the terminal A, in that it furthermore comprises two input capacitors $Cf_1$ and $Cf_2$ and two output capacitors $Cs_1$ and $Cs_2$, the input capacitors Cf1 and $Cf_2$ being connected on either side of the pairs of breakers $P_1$ and $P_2$, the output capacitor $Cs_1$ being connected on the one hand, to the point of connection between the transistors $SB_1$ and $ST_1$ of the additional pair $P_1$ and on the other hand, to the point of connection between the two transistors SB and ST of the pair P and the inductor L, the output capacitor Cs2 being connected between the point of connection between the transistors $SB_2$ and $ST_2$ of the additional pair $P_2$ and on the other hand, to the point of connection between the two transistors $SB_1$ and $ST_1$ of the pair $P_1$.

18. The series chopper as claimed in claim 4, wherein the diode in parallel with each breaker $SB_i$ can be the intrinsic diode of the component used.

19. The series chopper as claimed in claim 4, wherein the control inputs Cm1 and Cm2 of the breakers are not at any moment operated simultaneously into the on state.

20. The series chopper as claimed in claim 4, wherein the controls of the MOSs are of the control shifter or "level shifter" type, the controls being shifted, by adding between the controls of the MOSs a capacitor C and in parallel between the gates and sources of the MOSs of the added stage a resistor r, a diode d and a zener z.

* * * * *